United States Patent [19]

Owen

[11] Patent Number: 5,449,991
[45] Date of Patent: Sep. 12, 1995

[54] MOTOR CONTROL SYSTEM AND APPARATUS FOR PROVIDING DESIRED THREE-PHASE VOLTAGE THEREIN USING A MAIN TRANSFORMER ENERGIZED THROUGH AN AUTOTRANSFORMER

[75] Inventor: Donald W. Owen, Yukon, Okla.

[73] Assignee: Southwest Electric Company, Oklahoma City, Okla.

[21] Appl. No.: 124,292

[22] Filed: Sep. 20, 1993

[51] Int. Cl.⁶ .................................... H02S 13/00
[52] U.S. Cl. ............................ 318/500; 318/767; 336/148
[58] Field of Search ............... 318/17, 126, 138, 254, 318/500, 440, 442, 105, 106, 109, 799, 800, 801, 813, 767–770; 363/34, 37, 50, 55, 56, 62, 64; 336/90, 94, 145, 146, 147, 148

[56] References Cited

U.S. PATENT DOCUMENTS

| | | | |
|---|---|---|---|
| 742,926 | 11/1903 | Stuart . | |
| 1,320,980 | 11/1919 | Bowman . | |
| 1,910,202 | 5/1933 | Crago . | |
| 2,462,751 | 2/1949 | Koehler | 318/229 |
| 2,464,061 | 3/1949 | Soley, Jr. | 171/95 |
| 2,553,324 | 5/1951 | Lord | 171/119 |
| 2,713,667 | 7/1955 | Schwennesen | 336/183 |
| 2,791,646 | 5/1957 | Keroes | 179/171 |
| 2,811,699 | 10/1957 | Whittier | 336/69 |
| 2,878,441 | 3/1959 | Rogers et al. | 323/44 |
| 3,175,148 | 3/1965 | Swoish et al. | 336/90 |
| 3,284,669 | 11/1966 | Boyd | 317/13 |
| 3,286,153 | 11/1966 | Inose | 321/8 |
| 3,299,384 | 1/1967 | Lee | 336/171 |
| 3,439,622 | 4/1969 | Welty et al. | 103/35 |
| 3,443,157 | 5/1969 | Uptegraff, Jr. | 317/15 |
| 3,675,175 | 7/1972 | Dutton | 336/70 |
| 3,678,428 | 7/1972 | Morris et al. | 336/84 |
| 3,711,760 | 1/1973 | Kaiser | 321/5 |
| 3,737,745 | 6/1973 | Chevaugeon et al. | 318/52 |
| 3,832,659 | 8/1974 | Ita | 336/107 |
| 3,838,371 | 9/1974 | Willette | 335/278 |
| 3,842,186 | 10/1974 | Hall | 174/35 CE |
| 3,891,955 | 6/1975 | Horton, III | 336/205 |
| 3,895,335 | 7/1975 | Manimalethu | 336/183 |
| 3,924,165 | 12/1975 | Otto, Jr. et al. | 318/132 |
| 3,963,978 | 6/1976 | Kelley, Jr. et al. | 323/102 |
| 4,005,341 | 1/1977 | Uptegraff, Jr. et al. | 174/17 R |

(List continued on next page.)

FOREIGN PATENT DOCUMENTS

| | | |
|---|---|---|
| 0049642 | 4/1982 | European Pat. Off. . |
| 278636 | 1/1952 | Switzerland . |
| 306529 | 4/1930 | United Kingdom . |
| 409430 | 5/1934 | United Kingdom . |
| 557336 | 11/1943 | United Kingdom . |
| 765737 | 1/1957 | United Kingdom . |
| 1128887 | 10/1968 | United Kingdom . |
| 2076594 | 12/1981 | United Kingdom . |
| 2107527 | 4/1983 | United Kingdom . |

OTHER PUBLICATIONS

H. Cotton, "Electrical Technology", published: 1946, Sir Isaac Pitman & Sons, pp. 408–413.

Sketch labeled "Prior Art #1"—believed to be known, in public use or on sale at least one year before Oct. 31, 1990.

Sketch labeled "Prior Art #2"—believed to be known, in public use or on sale at least one year before Oct. 31, 1990.

Sketch labeled "Prior Art #3"—believed to be known, in public use or on sale at least one year before Oct. 31, 1990.

Sketch labeled "Prior Art #4"—believed to be known, in public use or on sale at least one year before Oct. 31, 1990.

(List continued on next page.)

Primary Examiner—Jonathan Wysocki
Attorney, Agent, or Firm—Dougherty, Hessin, Beavers & Gilbert

[57] ABSTRACT

A motor control system and apparatus for providing a desired three-phase voltage in the motor control system include: (1) a main transformer and components that are rated for one nominal voltage input, and (2) a commonly housed input transformer that transforms a different voltage power source to provide the nominal voltage input to the main transformer.

17 Claims, 1 Drawing Sheet

U.S. PATENT DOCUMENTS

| | | | |
|---|---|---|---|
| 4,073,000 | 2/1978 | Krejsa | 361/344 |
| 4,089,049 | 5/1978 | Suzuki et al. | 363/17 |
| 4,160,224 | 7/1979 | Owen | 336/147 |
| 4,223,255 | 9/1980 | Goldman et al. | 318/138 |
| 4,240,917 | 12/1980 | Pearce, Jr. et al. | 336/94 |
| 4,255,734 | 3/1981 | Owen | 336/147 |
| 4,256,932 | 3/1981 | Owen | 200/11 TC |
| 4,300,112 | 11/1981 | Leibinger et al. | 336/180 |
| 4,443,844 | 4/1984 | Grace | 363/56 X |
| 4,484,169 | 11/1984 | Nishikawa | 336/57 |
| 4,488,136 | 12/1984 | Hansen et al. | |
| 4,524,341 | 6/1985 | Owen | 336/147 |
| 4,535,253 | 8/1985 | Ootsuka et al. | 307/9 |
| 4,677,643 | 6/1987 | Dicks | 373/105 |
| 4,719,550 | 1/1988 | Powell et al. | 363/37 |
| 4,896,063 | 1/1990 | Roberts | 310/68 R |
| 5,130,616 | 7/1993 | Owen | 318/17 |
| 5,216,356 | 6/1993 | Owen | 323/361 |
| 5,267,134 | 11/1993 | Banayan | 363/40 |

OTHER PUBLICATIONS

Sketch labeled "Prior Art #5"—believed to be known, in public use or on sale at least one year before Oct. 31, 1990.

Sketch labeled "Prior Art #6"—believed to be known, in public use or on sale at least one year before Oct. 31, 1990.

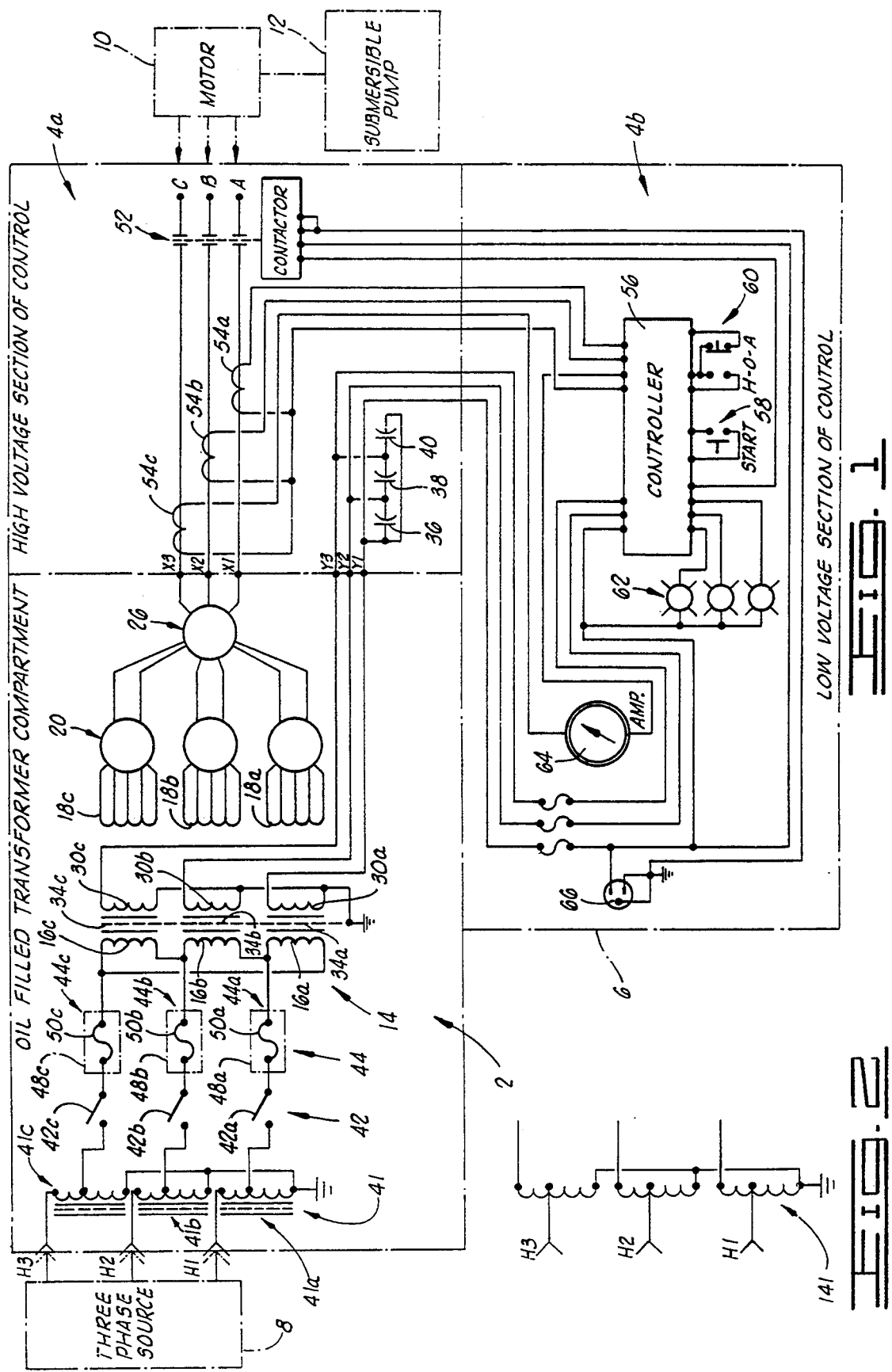

MOTOR CONTROL SYSTEM AND APPARATUS FOR PROVIDING DESIRED THREE-PHASE VOLTAGE THEREIN USING A MAIN TRANSFORMER ENERGIZED THROUGH AN AUTOTRANSFORMER

BACKGROUND OF THE INVENTION

This invention relates generally to a motor control system and an apparatus for providing a desired three-phase voltage in the motor control system. In a particular aspect, the invention relates to such a system and apparatus adapted to operate from a higher voltage primary source while still using industry standard lower voltage components. In another particular aspect, the invention relates to such a system and apparatus adapted to operate from a lower voltage primary source that is stepped up with a corresponding step down in current. The system and apparatus can be used in operating a three-phase motor to drive a submersible pump, for example.

Submersible pumps are used, for example, in oil wells at remote locations. Three-phase electric motors are typically used to drive these pumps. Such a motor is rated for a nominal line-to-line voltage which must be provided within a specified tolerance for the motor to work. This voltage is typically provided from an electric utility through a transformer and motor controller to provide the suitable voltage and control to operate the motor as desired. A motor control system and components of the system are disclosed in U.S. Pat. No. 5,130,616 to Owen.

A specific implementation of such a system is typically made for use with a specific nominal input voltage. For the exemplary system disclosed in the Owen patent, a specific implementation is preferably energized by a nominal alternating current (a.c.) 25 kilovolt (kV) (25,000 volts) line-to-line three-phase voltage. This is a conventional utility voltage in many countries, and accordingly many of the components of the particular implementation are not designed to operate at higher voltage levels. If a higher nominal input voltage were to be accommodated, more expensive and less readily available components would preferably be needed. For example, for a nominal 25 kVac voltage, components preferably have a 150 kV BIL (basic impulse insulation level) rating as known in the industry. Components at this rating are readily available and relatively inexpensive; however, higher BIL rated components that would preferably be used at a higher voltage (e.g., 33 kVac) are not as readily available and are more expensive.

Although the aforementioned nominal 25 kVac source is standard in many countries, a higher voltage source is used in many important oil producing countries where submersible pumps are needed. For example, in several Middle Eastern countries the standard utility power source is at 33 kVac. If the invention of the aforementioned Owen patent were to be used with such a power source, a specific implementation different from the 25-kVac implementation would be needed. That is, although the invention could be used, it would have to be implemented with higher rated components than an implementation limited to a maximum nominal input voltage of 25 kVac.

To avoid having to design a different overall implementation, construct such implementation with more costly components, and maintain multiple inventories, there is the need for an improved motor control system and apparatus for such system whereby a lower voltage implementation can be more simply modified for use with a higher voltage input power source.

There are also situations where maximum current into a primary of a transformer providing the desired voltage for the motor is a significant concern. Rather than redesigning the primary to accommodate a larger current in such a case, it may be preferable for economic reasons or otherwise, to step up a lower voltage power source to a higher voltage but lower current than is drawn by the motor at the lower voltage output by the transformer. The stepped-up higher voltage would preferably be the rated nominal input voltage of the transformer necessary to obtain the desired output voltage for the motor, and the lower current would preferably not exceed the rating of the primary of the transformer at such nominal input voltage. To provide for this, there is the need for an improved motor control system and apparatus for such system whereby a current-limited implementation can be accommodated without replacing the current-limited feature.

SUMMARY OF THE INVENTION

The present invention overcomes the above-noted and other shortcomings of the prior art and meets the aforementioned need by providing a novel and improved motor control system and apparatus for providing a desired three-phase voltage in the motor control system.

In meeting the aforementioned need, a preferred embodiment of the present invention lowers the continuous voltage applied to a disconnect switch, fuses and the primary of a main transformer of the motor control system. This allows, for example, industry standard (150 kV BIL) switches and fuse holders for a 25 kVac system to be used even when the input voltage is higher (e.g., 33 kVac). This preferred embodiment also forces transients that enter the input terminals to pass through impedances so that the transients are attenuated before they reach the disconnect switch, the fuses and the main transformer primary. This again allows the lower rated components to be used in the higher rated system.

The preferred embodiment can also limit the maximum fault current that can flow through the internal primary fuses. This allows limited interrupting capacity fuses to be used, again providing for reduced cost in accommodating a higher voltage power source.

The preferred embodiment can be implemented so that ferroresonance is prevented.

Another preferred embodiment allows a current-limited primary of a transformer to be used even when the motor draws from the secondary of the transformer a current that exceeds the current limit of the primary.

In one embodiment, an apparatus for providing a desired three-phase voltage in a motor control system in accordance with the present invention comprises: a compartment having an insulating fluid therein; a first step-down transformer disposed in the compartment, which first step-down transformer includes three-phase primary winding means for receiving a maximum rated three-phase voltage and further includes three-phase secondary winding means for providing a desired three-phase voltage in response to the maximum rated three-phase voltage applied to the primary winding means; a second step-down transformer disposed in the compartment for receiving from an electrical energy source an input three-phase voltage that is greater than the maximum rated three-phase voltage and for providing an output three-phase voltage that is not greater than the maximum rated three-phase voltage; and connector means disposed in the compartment for connecting the first and second step-down transformers, which connector means includes switch means and fuse means connected to the first and second step-down transformers.

In another embodiment, an apparatus for providing a desired three-phase voltage in a motor control system comprises: a compartment having an insulating fluid therein; a step-down transformer disposed in the compartment, which step-down transformer includes three-phase primary winding means for receiving a maximum rated three-phase current and further includes three-phase secondary winding means for providing a desired three-phase voltage in response to a rated three-phase voltage applied to the primary winding means; a step-up transformer disposed in the compartment for receiving from an electrical energy source an input three-phase voltage that is less than the rated three-phase voltage and for providing an output three-phase voltage equal to the rated three-phase voltage at a current not greater than the maximum rated three-phase current; and connector means disposed in the compartment for connecting the step-down and step-up transformers, which connector means includes switch means and fuse means connected to the step-down and step-up transformers.

In particular implementations, the second step-down transformer of the first-mentioned embodiment and the step-up transformer of the second-mentioned embodiment each includes a three-phase autotransformer having a neutral grounded internally within the compartment. More preferably, the three-phase autotransformer includes three single-phase wye-connected autotransformers connected to the switch means.

The present invention also provides a motor control system that includes such an apparatus. In general, such a system comprises: load connection output terminals for connecting to an external motor; first transformer means for conducting electric power consumed by the motor control system and the external motor, which first transformer means includes: a primary winding rated to receive a rated voltage, wherein the rated voltage is a selected alternating current voltage within the range of about 20 kilovolts (a.c.) to about 35 kilovolts (a.c.); and a secondary winding adapted to supply power directly to the external motor via the load connection output terminals; a motor controller for switchably connecting the secondary winding to the load connection output terminals, which motor controller includes switch terminals connected to the secondary winding and the load connection output terminals; power connection input terminals for connecting to an external electric power source providing alternating current voltage of at least about 20 kilovolts (a.c.) but different from the rated voltage of the primary winding; second transformer means, connected to the power connection input terminals and the primary winding of the first transformer means, for converting voltage from the external electric power source to the rated voltage for the primary winding of the first transformer means; and a single transportable containment means for holding the power connection input terminals, the load connection output terminals, the first and second transformer means and the motor controller.

Therefore, from the foregoing, it is a general object of the present invention to provide a novel and improved motor control system and apparatus for providing a desired three-phase voltage in the motor control system. Other and further objects, features and advantages of the present invention will be readily apparent to those skilled in the art when the following description of the preferred embodiments is read in conjunction with the accompanying drawings.

BRIEF DESCRIPTION OF THE DRAWING

FIG. 1 is a schematic circuit diagram of a preferred embodiment motor control system and apparatus of the present invention.

FIG. 2 is a schematic diagram of the windings of a step-up autotransformer for another preferred embodiment of the present invention.

DETAILED DESCRIPTION OF PREFERRED EMBODIMENTS

U.S. Pat. No. 5,130,616 to Owen and U.S. Pat. No. 5,216,356 to Owen are incorporated herein by reference.

A preferred embodiment of the motor control system and apparatus of the present invention is schematically shown in FIG. 1. The apparatus is embodied in a transformer circuit 2 which is used within the overall motor control system that also includes a motor controller circuit comprising a high voltage section 4a and a low voltage section 4b. These are enclosed within a transportable containment apparatus represented by dot-dash line 6.

The input of the transformer circuit 2 is adapted to be connected to a suitable power source, such as a three-phase electric utility power source 8. For the embodiment of FIG. 1, the source 8 typically provides a nominal line-to-line voltage higher than the tolerable line-to-line voltage of a load to be energized with the present invention. For the preferred embodiments described herein, the power source 8 provides a substantially constant a.c. voltage from within the range of about 4160 Vac to about 34500 Vac or above ("substantially constant" encompassing fluctuations from the nominal voltage in a conventional voltage source). The lower limit is more preferably about 20000 Vac because this is where BIL ratings begin for components used in a motor control system of the type to which the present invention is directed. In a specific implementation of the FIG. 1 embodiment, the voltage is nominally 33000 Vac (33 kVac). This is the input voltage to the transformer circuit 2. The FIG. 1 embodiment of the present invention lowers this voltage and controls its application to the load, such as a three-phase motor 10 connected to a submersible pump 12. The windings of the motor 10 are connected to outputs A, B, C, of the high voltage section 4a of the motor controller for the use illustrated in FIG. 1.

In a contemplated particular application, the motor control system would be placed at the base of a typical riser pole which supports the three-phase power lines of the utility power source 8. Cables from the source 8 would be run down the riser pole and connected to inputs H1, H2, H3 of the transformer circuit 2. From the outputs A, B, C of the high voltage section 4a, cables would be extended to a vented junction box from which cables would extend to connect to the motor 10.

Referring to FIG. 1, the transformer circuit 2 includes a main transformer 14. The main transformer 14, which is a step-down transformer in the illustrated embodiment, includes three primary windings 16a, 16b, 16c, and three secondary windings 18a, 18b, 18c. The windings 16, 18 are conventional. The secondary windings 18 are switchably interconnected by a suitable output selection switch 20, such as one used in transformers manufactured by Southwest Electric Company of Oklahoma City. In a particular embodiment, the switch 20 has two exterior handles mounted on shafts passing through the containment apparatus 6. Rotating the handles selects different taps from the windings 18 for providing different outputs. The handles are manually operated by a person standing on the ground adjacent the motor control apparatus. The switch 20 of the preferred embodiment provides a wide voltage range with all outputs being full kVA rated. The secondary of the transformer 14 is dedicated to a single load, namely the electrical submersible pump motor 10 in the preferred embodiment.

The thus selected portions of the windings 18 are then connected in either a delta or a wye connection by means of a switch 26 which has a handle mounted on a shaft of the switch 26 passing through the containment apparatus 6. An example of a suitable switch 26 is the RTE Components (Pewaukee, Wis.) 150A externally operated Series Multiple Switch.

Transformer 14 also includes tertiary windings 30a, 30b, 30c. The primary windings 16, the secondary windings 18 and the tertiary windings 30 are all inductively coupled within respective groups to provide a three-phase transformer. Each phase of the preferred embodiment is wound wherein a core leg supports the secondary winding 18a, the tertiary winding 30a and the primary winding 16a. Preferably, these windings are in a configuration with the tertiary winding 30a radially in between the primary winding 16a and the secondary winding 18a. A conventional electrostatic shield 34a is disposed between the primary winding 16a and the tertiary winding 30a. Whether the secondary is innermost and the primary outermost or vice versa is immaterial; what is preferred is that the tertiary is radially in between the two and that the electrostatic shield 34 (if used) is radially in between the tertiary and the primary. These same relationships for the tertiary and electrostatic shield should be retained if additional radially disposed windings are used within a winding group on a core leg. Each of the other two phases is similarly constructed. The core legs in the preferred embodiment are part of an overall iron core of a type known in the art.

The tertiary windings 30 provide electrostatic shielding so that the transformer 14 is double-shielded. This is achieved by grounding one end of each of the windings 30a, 30b, 30c as shown in FIG. 1 (alternatively, one tertiary winding could be grounded and the other tertiary windings could be connected to the grounded winding, or to both ground and the grounded winding). This places these common ends in a common ground connection with the conventional electrostatic shield 34. Thus, both the electrostatic shield 34 and the tertiary windings 30 filter electrostatically induced transients; therefore, they need to be disposed between the primary and secondary windings. So that each tertiary 30 can itself be shielded, the respective electrostatic shield 34 needs to be between the primary and the tertiary. A different degree of electrostatic shielding can be obtained by the tertiary windings 30 depending upon the particular winding configuration and axial length. In general, these should be such that the electrostatic induction between the primary windings 16 and the secondary windings 18 is measurably reduced. To maximize the shielding, the axial length of each tertiary winding should be at least as long as the longer of the respective primary winding or secondary winding.

The tertiary windings 30 also filter magnetically induced transients in conjunction with capacitors 36, 38, 40 physically located within the high voltage section 4a of the motor controller but electrically connected to the tertiary windings 30. The capacitors 36, 38, 40 shown in FIG. 1 are connected to the ends of the tertiary windings 30 opposite the ends thereof connected to electrical ground. The capacitance preferably is such that the magnitude of transient voltages induced into the tertiary and secondary windings by lightning or switching spikes imposed onto the primary windings is measurably reduced.

A third function of the tertiary windings 30 is to provide control power and metering voltages in the controller section. This is illustrated in FIG. 1 by the connections of the tertiary windings 30 to the low voltage section 4b of the motor control circuit.

In a particular implementation, each of the tertiary windings 30 is implemented by a respective layer of a 3/16 inch wide by 1/16 inch thick rectangular wire spirally wound on the respective electrostatic shield 34 with 3/16 inch spacing between turns. Within each phase of the transformer 14, each of the respective windings and the electrostatic shield is electrically insulated by being wrapped on kraft paper or other suitable insulating substrate known in the art.

The transformer circuit 2 also includes a primary winding circuit which connects the primary windings 16 to the power source 8 when the power source is connected to the high voltage terminals H1, H2, H3.

The primary winding circuit of the FIG. 1 embodiment includes a step-down input transformer 41 for receiving from the electrical energy source 8 an input three-phase voltage that is greater than a maximum three-phase voltage for which the primary windings 16 of the transformer 14 are rated. The input transformer 41 converts this input voltage to provide an output three-phase voltage that is not greater than such maximum rated three-phase voltage so that the main transformer 14 is adapted by the input transformer 41 for use with the power source 8 when such power source provides voltage above the maximum rating of the transformer 14. Thus, when the main transformer 14 is of a type that converts a line-to-line voltage of a first three-phase power source (e.g., one providing nominally 25 kVac) to a level compatible with the nominal line-to-line voltage rating of the motor 10, the input transformer 41 converts a line-to-line voltage of a second three-phase power source (e.g., one providing nominally 33 kVac) to a level equivalent to the line-to-line voltage of the first three-phase power source thereby enabling conventional lower voltage components to be used on the primary side of the transformer 14 even though there is a higher input voltage. Preferably, the primary windings 16 are rated to receive a rated voltage that is a selected alternating current voltage within the range of about 20 kVac to about 35 kVac. This selection is made preferably in response at least in part to a desired BIL rating for a primary switch and fuses preferably to be used as subsequently described.

Although any suitable transformer can be used for the input transformer 41, a three-phase autotransformer having a neutral grounded internally within the compartment of the system is preferred. More preferably, the transformer 41 includes three single-phase wye-connected autotransformers 41a, 41b, 41c connected respectively to the high voltage inputs H1, H2, H3 and to respective terminals of a primary switch 42 as illustrated in FIG. 1. It is through the primary switch 42 that the output terminals of the autotransformers 41 are connected to respective nodes of the delta-connected primary windings 16 as shown in FIG. 1. Three single-phase transformers are more effective at reducing or preventing ferroresonance than one three-phase transformer having a four- or five-legged core design. Autotransformers are preferred because they have lower leakage reactances, lower losses, smaller exciting current and lower cost than two-winding transformers when the voltage ratio does not differ too greatly from 1:1.

The primary switch 42 to which the input transformer 41 is connected is used for selectably energizing and de-energizing the main transformer 14 and the motor controller from the power source 8. The switch 42 of the preferred embodiment is intended to be operated manually by a person standing on the ground adjacent where the motor control system is located. This operation is direct, i.e., without the aid of any tools, such as a hot stick. The switch 42 should be rated at least for interrupting full load current. The switch 42 is a true emergency safety disconnect switch which can be directly operated by a person to break the current conductive path between a connected power source and the primary windings 16. When the switch 42 makes or completes the current conductive path, the a.c. voltage from the secondary of the transformer 41 is applied to the primary windings 16 so that an induced a.c. output voltage is provided on the secondary windings 18. This causes an output current to flow in a secondary winding circuit connected to the secondary windings 18 if the secondary winding circuit is completed as subsequently described. The resulting current which flows through the primary side of the main transformer 14 is proportional to such output current. The switch 42 is preferably one which is oil-insulated so that it is relatively inexpensive despite being able to break full load current. Any suitable type switch can be used, such as a RTE Components two-position Loadbreak/Loadmake stored energy type switch. This is a three-phase switch with one pole per phase connected in series between the respective component of the input transformer 41 and a respective primary winding 16 of the main transformer 14. The operating mechanism of the switch 42 includes a shaft which extends through the containment apparatus 6. This pass-through of the containment apparatus 6 and the others referred to herein are made fluid-tight by suitable sealing members as would be readily known in the art.

Connected in series with the respective section of the switch 42 are load sensing fuses 44a, 44b, 44c. The switch 42 and the fuse 44 can be in either order within the series configuration between the two transformers 14, 41.

The fuses 44 are preferably field replaceable, such as by being contained within draw-out mechanisms that penetrate the side of the containment apparatus 6. Each fuse 44 includes a fuse carrier 48 having terminals connected in the electrical series as represented in FIG. 1. The fuse carrier 48 is also connected to the containment apparatus 6 so that an opening of the fuse carrier communicates outside the containment apparatus 6. A fuse member 50 is releasably connected within the fuse carrier 48 and is replaceable through the opening of the fuse carrier 48. A particular type of fuse which can be used is the RTE Components Bay-O-Net Fuse Assembly with the RTE Components Dual Sensing Bay-O-Net Fuse Link.

The fuses 44 are relatively inexpensive because they provide a lower current interrupting capacity. The fuses 44 are capable of interrupting a fault current with a magnitude limited solely by the sum of the internal impedance of the power source 8 added to the impedance of the transformer 41 with a short circuit anywhere downstream from the transformer 41. Stated another way, the fuses 44 stop current flow within the primary winding circuit in response to current flowing therethrough exceeding a predetermined level in response to a short-circuit fault anywhere downstream from the transformer 41. For example, when a short-circuit fault on the secondary side of the transformer 14 occurs, the magnitude of the output current increases and the magnitude of the input current increases in response. When the increase of the input current reaches a predetermined level, the fuses 44 clear. The predetermined level corresponds to the selected rating of the fuses 44. When the fuses clear, the main transformer 14 and the secondary winding circuit are de-energized. This protects the portion of the system upstream of the fault (towards the power source).

Although not shown in the drawing, the transformer circuit can also include suitable conventional arresters to shunt each line to ground in a conventional manner.

The motor controller components of the motor control sections 4a, 4b are conventional. Typically, the particular motor controller would be specified by the user to coordinate with other equipment. An example of a typical controller is a Keltronics brand motor controller.

Referring to FIG. 1, the high voltage section 4a includes a vacuum contactor 52 which is electrically operable to connect or disconnect the outputs from the switch 26 to the terminals A, B, C (and the motor 10 when connected thereto). The outputs from the switch 26 are provided to the high voltage section 4a through terminals X1, X2, X3. In the preferred embodiment the output includes a substantially constant a.c. voltage within the range of about 460 Vac to about 4160 Vac. There is one contactor pole per phase in series between the secondary of the main transformer 14 and the output terminals A, B, C. The contactor 52 is an electrically operated start-stop switch which turns a motor connected to the terminals A, B, C on or off when the output voltage is available at the contactor poles connected to the selected secondary winding sections through the switches 20, 26 and the terminals X1, X2, X3. These connected components comprise the secondary winding circuit by which the motor 10 is connected to the secondary of the transformer 14. The wiring, such as cables, used to connect the motor 10 to the terminals can also be part of the secondary winding circuit. When the contactor 52 is in a conductive state, and the motor 10 is connected, the entire secondary circuit is completed so that if there is output voltage it is applied to the motor and output current flows through the secondary windings, the secondary winding circuit and the motor (when reference is made to a voltage being applied or the like from one point to another, this encompasses any voltage drops across intervening circuitry). When the contractor 52 is in a non-conductive state, the motor 10 is not energized.

The high voltage section 4a also includes three current transformers 54a, 54b, 54c which sense current through the respective phase output line to provide control signals to a solid state logic controller 56 in the low voltage section 4b.

The controller 56 also receives sensing inputs, as well as energizing electricity, from the tertiary windings 30. The controller 56 is operated by start and h-o-a (hand-off-automatic) switches 58, 60, respectively. Indicator lights 62 signal operating conditions in a known manner. A chart recorder/ammeter 64 is also included in the low voltage section 4b, as is a convenience outlet 66.

The transportable containment apparatus 6 of the preferred embodiment includes a single, multicompartment enclosure mounted on a skid. The skid provides a base for supporting the housing on the ground. The containment apparatus 6 can be positioned before or after the external connection cables have been installed at the site where the present invention is to be used.

The multicompartment enclosure includes a compartment for receiving the components of the transformer circuit 2 shown in FIG. 1. These include the transformer 14 (except for the capacitors 36, 38, 40), the transformer 41, the primary switch 42 and the fuses 44. In the preferred embodiment these components are immersed within a volume of insulating fluid, such as a suitable oil known in the art. The surface of the fluid is below the access openings of the fuse carriers 48 of the field replaceable fuses 44. The portion of each fuse carrier 48 into which its replaceable fuse element 50 is connected is, however, below the surface of the fluid, as are the other components of the transformer circuit 2 which are within the compartment.

The enclosure includes another compartment in which the capacitors 36, 38, 40 and the components of the motor control sections 4a, 4b are located. At one end of this compartment there is an outer door. There is an inner door located within the interior of this compartment to divide it into two chambers. The components of the low voltage section 4b shown in FIG. 1 are located in the outer chamber and on the outer door, and the capacitors 36, 38, 40 and the components of the high voltage section 4a shown in FIG. 1 are located within the inner chamber.

The enclosure includes a further compartment containing the high voltage terminals H1, H2, H3 (FIG. 1) to which the power source 8 connects. A door is connected at one end of this compartment.

In use, the motor control system of the present invention is transported to a location where it is to be connected to a power source and a load, such as the power source 8 and the motor 10 and submersible pump 12 combination. Transportation to and placement at the location are facilitated by the single containment housing 6 which has all the electrical components located and interconnected therein.

Once at the location, conventional power connections are made to the high voltage terminals H1, H2, H3, and conventional load connections are made to the terminals A, B, C in the high voltage section 4a. Operation then proceeds as described in the United States Patents to Owen incorporated herein by reference, except that the transformer 41 converts the voltage input from the source 8 to the level for which the transformer 14 is rated.

Another preferred embodiment of the present invention includes an input transformer 141 having the winding arrangement shown in FIG. 2. The transformer 141 is used in place of the transformer 41 shown in FIG. 1, and it is so used when the primary windings 16 of the main transformer 14 are rated to a maximum three-phase current that is to be accommodated by using a power source 8 that provides an alternating current voltage which is less that the selected rated input voltage for the main transformer 14. The input transformer 141 steps up the voltage from the power source 8 to the rated input voltage for the main transformer 14 while stepping down the current so that the maximum current from the transformer 141 at the rated voltage of the primary windings 16 of the main transformer 14 is not greater than the maximum rated current of the primary windings 16. A non-limiting example is as follows:

| | |
|---|---|
| main transformer 14 maximum input voltage rating | 8320 V |
| main transformer 14 maximum input current rating | 150 A |
| power source 8 nominal voltage | 4160 V |
| input transformer 141 output voltage | 8320 V |
| input transformer 141 maximum output current at said output voltage | 150 A |

If the load current drawn from the secondary windings 18 of the main transformer 14 requires current exceeding the maximum rated current of the primary windings 16, then this overloads the system and either pulls the input voltage down or clears the fuses 44.

The other aspects described above with regard to the FIG. 1 embodiment apply to the preferred embodiment using the transformer 141. Thus, the transformer 141 is also preferably an autotransformer (except configured for stepping up voltage) as described above.

Thus, the present invention is well adapted to carry out the objects and attain the ends and advantages mentioned above as well as those inherent therein. While preferred embodiments of the invention have been described for the purpose of this disclosure, changes in the construction and arrangement of parts can be made by those skilled in the art, which changes are encompassed within the spirit of this invention as defined by the appended claims.

What is claimed is:

1. Apparatus for providing a desired three-phase voltage in a motor control system, comprising:
    a compartment having an insulating fluid therein;
    a first step-down transformer disposed in said compartment, said first step-down transformer including three-phase primary winding means for receiving a maximum rated three-phase voltage and further including three-phase secondary winding means for providing a desired three-phase voltage in response to said maximum rated three-phase voltage applied to said primary winding means;
    a second step-down transformer disposed in said compartment for receiving from an electrical energy source an input three-phase voltage that is greater than said maximum rated three-phase voltage and for providing an output three-phase voltage that is not greater than said maximum rated three-phase voltage, wherein said second step-down transformer includes a three-phase autotransformer having a grounded neutral; and
    connector means disposed in said compartment for connecting said first and second step-down transformers, said connector means including switch means and fuse means connected to said first and second step-down transformers.

2. Apparatus as defined in claim 1, wherein said maximum rated three-phase voltage is nominally 25 kilovolts (a.c.) and said input three-phase voltage is nominally 33 kilovolts (a.c.).

3. Apparatus as defined in claim 1, wherein said three-phase autotransformer includes three single-phase wye-connected autotransformers connected to said switch means.

4. Apparatus for providing a desired three-phase voltage in a motor control system, comprising:
  a compartment having an insulating fluid therein;
  a step-down transformer disposed in said compartment, said step-down transformer including three-phase primary winding means for receiving a maximum rated three-phase current and further including three-phase secondary winding means for providing a desired three-phase voltage in response to a rated three-phase voltage applied to said primary winding means;
  a step-up transformer disposed in said compartment for receiving from an electrical energy source an input three-phase voltage that is less than said rated three-phase voltage and for providing an output three-phase voltage equal to said rated three-phase voltage at a current not greater than said maximum rated three-phase current, wherein said step-up transformer includes a three-phase autotransformer having a grounded neutral; and
  connector means disposed in said compartment for connecting said step-down and step-up transformers, said connector means including switch means and fuse means connected to said step-down and step-up transformers.

5. Apparatus as defined in claim 4, wherein said three-phase autotransformer includes three single-phase wye-connected autotransformers connected to said switch means.

6. A motor control system, comprising:
  load connection output terminals for connecting to an external motor;
  first transformer means for conducting electric power consumed by said motor control system and the external motor, said first transformer means including:
    a primary winding rated to receive a rated voltage, wherein the rated voltage is a selected alternating current voltage within the range of about 20 kilovolts (a.c.) to about 35 kilovolts (a.c.); and
    a secondary winding adapted to supply power directly to the external motor via said load connection output terminals;
  a motor controller for switchably connecting said secondary winding to said load connection output terminals, said motor controller including switch terminals connected to said secondary winding and said load connection output terminals;
  power connection input terminals for connecting to an external electric power source providing alternating current voltage of at least about 20 kilovolts (a.c.) but different from the rated voltage of said primary winding;
  second transformer means, connected to said power connection input terminals and said primary winding of said first transformer means, for converting voltage from the external electric power source to the rated voltage for said primary winding of said first transformer means, wherein said second transformer means includes a three-phase autotransformer means having a grounded neutral; and
  a single transportable containment means for holding said power connection input terminals, said load connection output terminals, said first and second transformer means and said motor controller.

7. A motor control system as defined in claim 6, further comprising a switch and a load-sensing fuse connected in electrical series between said second transformer means and said primary winding.

8. A motor control system as defined in claim 7, wherein said first and second transformer means, said switch and said fuse are submerged in oil within said containment means.

9. A motor control system as defined in claim 8, wherein said three-phase autotransformer includes three single-phase wye-connected autotransformers connected to said switch.

10. A motor control system as defined in claim 6, wherein the alternating current voltage selected as the rated voltage of said primary winding of said first transformer means is selected in response to a desired basic impulse insulation level rating for said switch and load-sensing fuse.

11. A motor control system as defined in claim 6, wherein:
  said primary winding is rated for a maximum current;
  the alternating current voltage selected as the rated voltage of said primary winding is greater than the alternating current voltage provided by the external electric power source; and
  said autotransformer includes step-up transformer means for providing the rated voltage for said primary winding at a current not greater than the maximum current for which said primary winding is rated.

12. A motor control system as defined in claim 6, wherein said three-phase autotransformer includes three single-phase wye-connected autotransformers connected to said primary winding.

13. A system for operating a three-phase motor having a nominal line-to-line voltage rating, comprising:
  first three-phase transformer means for converting a line-to-line voltage of a first three-phase power source to a level compatible with the nominal line-to-line voltage rating of the motor, said first three-phase transformer means including a three-phase primary and a three-phase secondary;
  second three-phase transformer means, connected to said first three-phase transformer means, for converting a line-to-line voltage of a second three-phase power source to a level equivalent to said line-to-line voltage of said first three-phase power source so that said first three-phase transformer means is adapted by said second three-phase transformer for use with said second three-phase power source, wherein said second three-phase transformer means includes a three-phase autotransformer having a grounded neutral;
  primary switch means, connected to said second three-phase transformer means and to said three-phase primary of said first three-phase transformer means, for selectably energizing or de-energizing said three-phase primary from said second three-phase power source in response to direct manual operation of said primary switch means by a person adjacent said primary switch means when said second three-phase transformer means is connected to said second three-phase power source;

motor control means, connected to said three-phase secondary of said first three-phase transformer means, for controlling the application of a three-phase output from said three-phase secondary to the three-phase motor; and a housing having said first and second three-phase transformer means, said primary switch means and said motor control means disposed therein.

14. A system as defined in claim 13, further comprising three fuses disposed within said housing, each of said three fuses connected in electrical series with said primary switch means for a respective phase of said second three-phase power source.

15. A system as defined in claim 14, wherein said three-phase autotransformer includes three single-phase wye-connected autotransformers connected to said primary switch means.

16. A system as defined in claim 13, wherein said three-phase autotransformer includes three single-phase wye-connected autotransformers connected to said primary switch means.

17. Apparatus for providing a desired three-phase voltage in a motor control system, comprising:

a step-down transformer including:
an iron core;
three delta-connected primary windings mounted on said core and forming part of a voltage input circuit, said primary windings rated to receive a maximum rated three-phase voltage at nodes of said delta-connected primary windings; and three secondary windings inductively coupled with said primary windings on said core, wherein said secondary windings provide, in response to applying the maximum rated three-phase voltage to said primary windings, a desired three-phase voltage for a three-phase motor connected to said secondary windings through the motor control system; and transformer means for reducing or preventing in said voltage input circuit ferroresonance due to said iron core-mounted delta-connected primary windings connected in said voltage input circuit, said transformer means including an autotransformer having three wye-connected windings with a grounded common wye connection, each of said wye-connected windings adapted for connecting at an input thereof to an electric power utility source and connected at an output thereof to a respective one of said nodes of said three delta-connected primary windings in said voltage input circuit so that said autotransformer not only reduces or prevents said ferroresonance but also provides said maximum rated three-phase voltage to said primary windings in response to a conventional three-phase utility voltage of said electric power utility source.

* * * * *